United States Patent
Aley (10) Patent No.: US 8,577,861 B2
(45) Date of Patent: Nov. 5, 2013

(54) APPARATUS AND METHOD FOR SEARCHING INFORMATION (75) Inventor: James Aley, London (GB)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 13/054,553

(22) PCT Filed: Jul. 17, 2009

(86) PCT No.: PCT/IB2009/053120
§ 371 (c)(1),
(2), (4) Date: Apr. 5, 2011

(87) PCT Pub. No.: WO2010/007597
PCT Pub. Date: Jan. 21, 2010

(65) Prior Publication Data
US 2011/0270874 A1 Nov. 3, 2011

(30) Foreign Application Priority Data
Jul. 17, 2008 (GB) .................................. 0813123.7

(51) Int. Cl.
G06F 17/30 (2006.01)

(52) U.S. Cl.
USPC ............................ 707/706; 707/768; 707/769

(58) Field of Classification Search
USPC .......................... 707/705, 769–778
See application file for complete search history.

(56) References Cited

U.S. PATENT DOCUMENTS

| 6,243,713 | B1 | 6/2001 | Nelson et al. |
| 6,466,901 | B1 | 10/2002 | Loofbourrow et al. |
| 6,794,363 | B2* | 9/2004 | Bejanin et al. ............ 514/20.1 |
| 7,149,748 | B1 | 12/2006 | Stephan |
| 2003/0069882 | A1 | 4/2003 | Nieswand et al. |
| 2005/0210003 | A1* | 9/2005 | Tsay et al. ................. 707/3 |
| 2006/0271522 | A1 | 11/2006 | Scott, III et al. |
| 2007/0027854 | A1 | 2/2007 | Rao et al. |
| 2007/0220023 | A1* | 9/2007 | Dean et al. ................ 707/101 |
| 2007/0255698 | A1* | 11/2007 | Kaminaga et al. ......... 707/3 |
| 2008/0005057 | A1 | 1/2008 | Ozzie et al. |
| 2008/0086488 | A1* | 4/2008 | Nomula et al. ............ 707/101 |
| 2010/0063892 | A1* | 3/2010 | Keronen et al. .......... 705/26 |
| 2011/0040733 | A1* | 2/2011 | Sercinoglu et al. ........ 707/688 |

OTHER PUBLICATIONS

International Search Report/Written Opinion for Application No. PCT/IB2009/053120 dated Oct. 21, 2009.
Extended European Search Report from European Patent Application No. 09 79 7621 mailed Oct. 22, 2012.

* cited by examiner

Primary Examiner — Hanh Thai
(74) Attorney, Agent, or Firm — Alston & Bird LLP (57) ABSTRACT A method and apparatus for use in servicing a search request where the search request comprises a plurality of parts (such as characters) and establishing a list of tokens where the tokens correspond to elements of objects and have a numerical value. For each part of the search request a subset of the list is determined, said subset identifying a set of objects which may satisfy the search query. The subsets may be identified iteratively. Token encoding is used to encode tokens based on a content of said elements and, in this case, the same token encoding is used to encode the parts of the search request. The token encoding may comprise differential encoding. In certain embodiments, resource requirements necessary to complete the search request are determined based on the identified subsets.

18 Claims, 9 Drawing Sheets

Fig. 14

APPARATUS AND METHOD FOR SEARCHING INFORMATION

RELATED APPLICATION

This application was originally filed as Patent Cooperation Treaty Application No. PCT/IB2009/053120 filed Jul. 17, 2009, which claims priority to Great Britain Application No. 0813123.7 filed Jul. 17, 2008.

TECHNICAL FIELD

Embodiments of the present invention relate generally to searching and finding information.

BACKGROUND

Certain searches involve collating a repository of information and extracting a subset of the repository by running a query against the data. In many computing systems, database systems comprising an information store and a database server to access the store and service client requests exist. The client requests are satisfied by identifying certain objects held in the information store.

SUMMARY OF EMBODIMENTS OF THE INVENTION

An embodiment of the invention provides a method comprising:
accessing an ordered list comprising a plurality of tokens, said tokens corresponding to elements of one or more objects, said list storing, for each token in said list, a corresponding document identifier, wherein said list is ordered according to a value of said token,
receiving a search term comprising a plurality of parts,
identifying a subset of said list for a first part of said search term and a further subset for at least one subsequent part of said search term, wherein each subset corresponds to possible results for said search term.

Successive subsets may be iteratively identified for more than one successive part of said search term. In this case, each iteration may have a corresponding part of the search term and a subset corresponding to the iteration is identified with reference to the corresponding part, and each preceding part, of the search term.

The tokens may have a numerical value and, in this case, the list may be ordered according to a numerical value of the tokens. In certain embodiments, the numerical value is represented in the list as a floating point number.

The objects may comprise electronic objects such as computer readable entities and said elements may comprise associated meta-data. In certain embodiments, the meta-data relates to characteristics of the computer readable entities. The meta-data may be represented with the use of characters.

In one embodiment, the elements may be words and the objects may be documents containing said words.

The tokens may be encoded according to a token encoding. In certain embodiments, the token encoding is chosen so that two or more of said elements may correspond to the same token. The token encoding may include rules determine which elements are to be encoded as tokens. In this embodiment not all elements will have a corresponding token.

Each of the parts of the search term may comprise at least one character and the parts may then be encoded according to the token encoding to produce corresponding search tokens.

Each character of the search term may comprise a part and, in this instance, each part is encoded according to the token encoding.

The token encoding may comprise differential encoding whereby a value for a second and each subsequently encoded character is dependent on a value of a preceding character.

The token encoding may be dependent upon a platform accuracy. More specifically, the token encoding may be dependent on an available memory address space.

In further embodiments, the method further comprises:
for an identified subset, determining a resource requirement necessary to complete a search request,
determining if said resource requirement meets a specified criteria; and
completing said search request if said resource requirement meets said specified criteria.

Successive subsets may be iteratively identified for corresponding successive parts of said search term and, for a successive subset of a successive iteration, a determination may be made to determine if said resource requirement meets said specified criteria. In certain embodiments, the determination of whether the resource requirement meets said specified criteria may be made for each iteration.

The specified criteria may be specified by a user and/or calculated by software. Furthermore, the resource requirement may relates to one or more of: power, memory availability, processor speed and bandwidth.

Determining whether a resource requirement necessary to complete a search request may be carried out with reference to one or more of: a number of parts of said search term, a number of documents which may be associated with said search term, or a number of characters utilised in said token encoding.

A further embodiment of the invention relates to apparatus comprising:
at least one processor,
and at least one memory including computer code, the at least one memory and the computer code configured to, with the at least one processor, cause the apparatus at least to perform:
accessing an ordered list comprising a plurality of tokens, said tokens corresponding to elements of one or more objects, said list storing, for each token in said list, a corresponding document identifier, wherein said list is ordered according to a value of said token,
receiving a search term comprising a plurality of parts,
identifying a subset of said list for a first part of said search term and a further subset for at least one subsequent part of said search term, wherein each subset corresponds to possible results for said search term.

In exemplary further embodiments, the apparatus may be a client or a server and may be implemented as a mobile computing device.

The at least one memory and the computer code may be further configured to, with the at least one processor, cause the apparatus to iteratively identify successive subsets for more than one successive part of said search term.

In some embodiments, each iteration has a corresponding part of said search term and a subset corresponding to said iteration is identified with reference to said corresponding part, and each preceding part, of said search term.

The tokens may have a numerical value and said list is ordered according to a numerical value of said tokens, in which case each may be represented in the list as a floating point number.

In some embodiments, said elements are words and wherein said tokens are encoded according to a token encoding.

The token encoding may be chosen so that two or more of said elements may correspond to the same token.

Each of said parts of said search term may comprise at least one character and said parts may be are encoded according to said token encoding to produce corresponding search tokens.

In some embodiments, each character of said search term comprises a said part and wherein the at least one memory and the computer code are further configured to, with the at least one processor, cause the apparatus to encode each part is according to said token encoding.

Said token encoding may comprise differential encoding whereby a value for a second and each subsequently encoded character is dependent on a value of a preceding character.

Said token encoding may be dependent upon a platform accuracy.

The at least one memory and the computer code are, in some embodiments, further configured to, with the at least one processor, cause the apparatus to:

for an identified subset, determine a resource requirement necessary to complete a search request, determine if said resource requirement meets a specified criteria; and complete said search request if said resource requirement meets said specified criteria.

The at least one memory and the computer code may be further configured to, with the at least one processor, cause the apparatus to iteratively identify successive subsets for more than one successive part of said search term and, for a successive subset of a successive iteration, determine if said resource requirement meets said specified criteria.

Said specified criteria may be specified by a user and/or calculated by software.

Said resource requirement may relate to one or more of: power, memory availability, processor speed, and bandwidth.

Determining a resource requirement necessary to complete a search request may be carried out with reference to one or more of: a number of parts of said search term, a number of documents which may be associated with said search term, and a number of characters utilised in said token encoding.

BRIEF DESCRIPTION OF THE DRAWINGS

Embodiments of the invention are hereinafter described with reference to the accompanying diagrams where.

DESCRIPTION OF EMBODIMENTS

A description of a number of embodiments of the invention follows, provided by way of example only.

Figure 1:
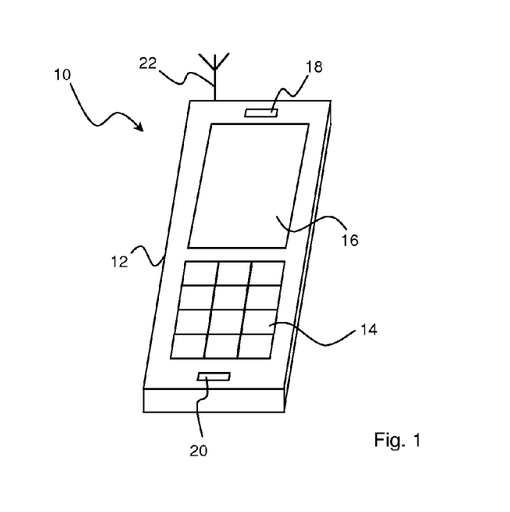
FIG. 1 is a representation of a mobile computing device according to an embodiment of the invention.

FIG. 1 is a schematic diagram of a mobile computing device 10 having a casing 12. The computing device 10 forms the basis of the embodiments to be described. The casing 12 of the device 10 encapsulates a keypad 14, a screen 16, a speaker 18 and a microphone 20. The device 10 further includes an antenna 22. The device 10 illustrated in FIG. 1 is a mobile device in that it may be held in a user's hand and used to participate in communication sessions, in particular, telephone calls. During such sessions the device 10 may be utilised so that the speaker 18 is held to a user's ear and the microphone 20 is situated in proximity to a user's mouth.

Figure 2:
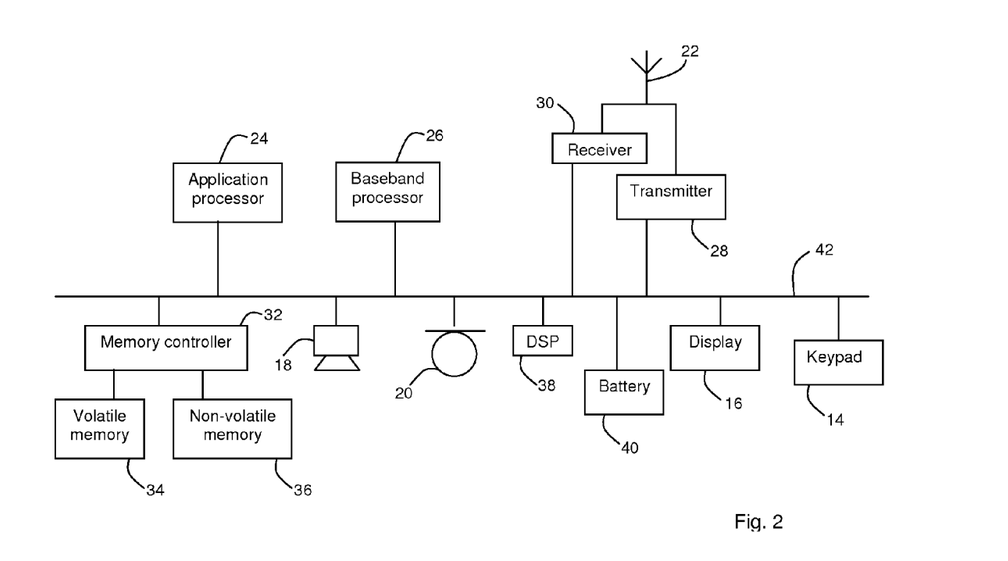
FIG. 2 illustrates an arrangement of hardware components of the computing device of FIG. 1.

FIG. 2 is a schematic illustration showing the arrangement of certain of the hardware components of the device 10 of FIG. 1. The keypad 14, display 16, speaker 18 and microphone 20 shown in FIG. 1 are connected to a system bus 42. The bus 42 is further connected to an application processor 24, a baseband processor 26, a digital signal processor 38, a transmitter 28, a receiver 30 and a battery 40. Transmitter 28 and receiver 30 are connected to the antenna 22. The bus 42 is further connected to a memory controller 32 which is, in turn, connected to volatile memory 34 and non-volatile memory 36. The application processor 24 processes instructions related to various software modules and operating system software which run on the device 10 and which provide various functionality of the device 10. The baseband processor 26 is concerned with the communication functions and to this end controls a telephony stack and communicates with the transmitter 28 and receiver 30 to establish communications by means of the antenna 22. The various processing elements of the device 10 such as the application processor 24 and baseband processor 26 may be provided on a single processor.

Memory controller 32 controls the access to, and interaction with, volatile memory 34 and non-volatile memory 36. In this manner the application processor 24 is able to communicate with the various hardware elements as well as the memory controller 32 and thereby control the operation of the various hardware elements according to software instructions stored on volatile memory 34 or non-volatile memory 36.

Only a single bus, bus 42, is illustrated in FIG. 2. It is to be realised that this bus may be replaced by two or more buses and that the topology of FIG. 2 would vary accordingly. Furthermore, known computing devices include hardware components additional to those illustrated in FIG. 2, but these are well known in the art and are not further described herein.

Figure 3:
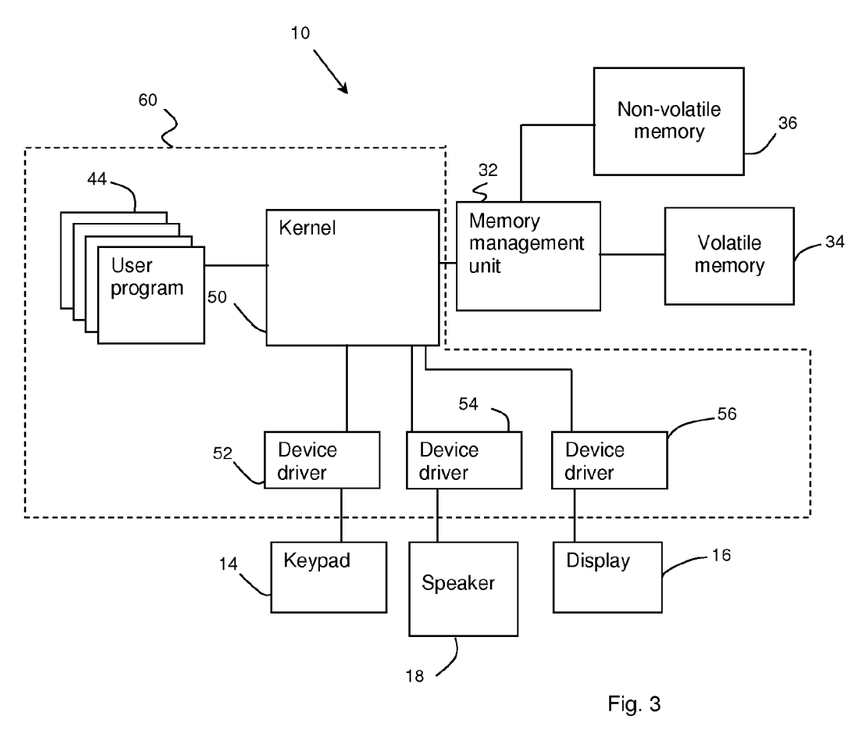
FIG. 3 illustrates an arrangement of hardware and software components of the computing device of FIG. 2.

FIG. 3 is a diagram illustrating various hardware and software components of the device 10. The software operating on the device 10 can be categorised in various ways. Certain software operates to manage the resources provided by the various hardware components and to establish an operational environment in which other software executes. This software is known as the operating system of the device and is represented in FIG. 3 by a kernel 50. The kernel interacts with the memory management unit 32 which, as previously described, is connected to volatile memory 34 and non-volatile memory 36. The kernel 50 is further connected to a plurality of user programs 44 each of which may access the hardware components in a manner dictated by the kernel 50. The kernel 50 is further connected to the keypad 14 by means of device driver 52, to speaker 18 by means of device driver 54 and to the display 16 by means of device driver 56. Only certain of the hardware components have been illustrated but, generally, the kernel 50 controls the hardware resources of the device 10 through various device drivers. Furthermore, although the device drivers have been illustrated as separate to the kernel 50, it is possible for them to be incorporated into the kernel 50.

The software components of FIG. 3 are delineated by dashed area 60. However, this distinction between software and hardware is not essential. Components depicted as software in FIG. 3 may be rendered in hardware, and those depicted as hardware may, in certain circumstances, be rendered as software.

During operation of the device, software instructions stored in non-volatile memory 36 establish the kernel 50, the user programs 44 and the device drivers 52, 54 and 56. Through the use of the various components illustrated in FIG. 3 a user is able to utilise the device 10 according to the functionality provided by the various user programs 44. For example, a user uses the keypad 14 to communicate with the kernel 50 by means of device driver 52 to cause one of the user programs 44 to access data stored on non-volatile memory 36 by means of memory management unit 32. The kernel 50 causes the data supplied by memory management unit 32, together with instructions supplied by the user program, to be sent to the application processor 24 (FIG. 2). The application processor 24 will return results from the data and instructions, generally utilising volatile memory 34 in the process, and these will be returned to the user program by the kernel 50. On further instructions from the user program, the kernel 50 will cause the results to be displayed to the user on display 16 by means of device driver 56. It is to be realised that device drivers 52, 54 and 56 are also software components originating from instructions stored on non-volatile memory 36.

The illustration of FIG. 3 is presented merely by way of example. Known devices comprise more or fewer components than those shown. Implementations of embodiments of the invention are not dependent on the precise arrangement and configuration of the components shown in FIGS. 1, 2 and 3. Therefore other components with similar functionality may be substituted and further components added thereto or illustrated components omitted therefrom without affecting the operation of embodiments of the invention.

Figure 4:
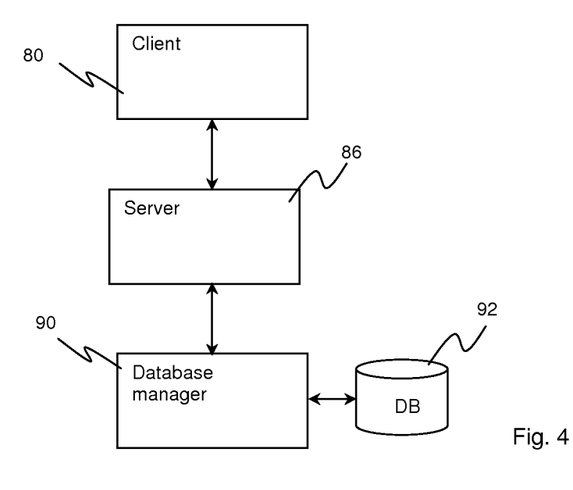
FIG. 4 is a diagram of an arrangement of software components according to an embodiment of the invention.

FIG. 4 illustrates certain of the software elements running on the computing device 10 previously described. A client 80 is connected to a server 86. The server 86 is connected to a database manager 90 which controls and manages a database 92. In this embodiment, the database 92 is stored on non-volatile memory 36. In this embodiment, each of the components shown is implemented as one of the user programs 44 (FIG. 3).

The server 86 operates as a search server which receives search requests generated by the client 80 and communicates with the database manager 90 to service the search requests. It is to be realised that certain calculations are involved in generating the search request and then servicing the request. In certain embodiments, the client performs a majority of the calculations whereas in further embodiments the server performs a majority of the calculations. In a further embodiment certain calculations are performed by the client, and other calculations by the server. It is also to be realised that the processing carried out by the database manager may vary according to the amount of calculations performed by the client or server and although the server, client, database manager and database have been depicted as distinct components, in other embodiments more or fewer components implement the same functionality.

Figure 5:
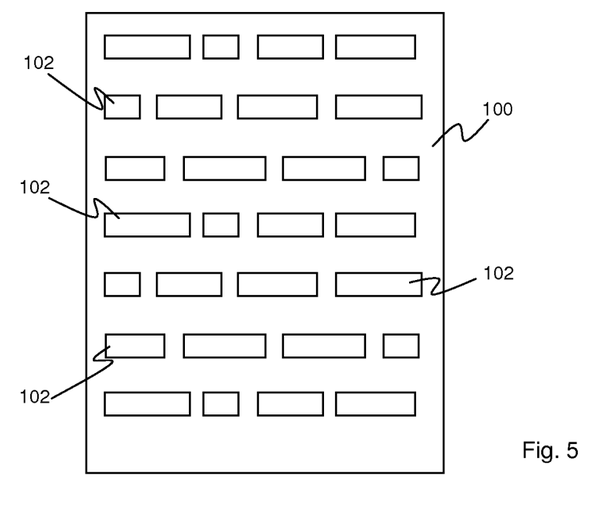
FIG. 5 illustrates an object comprising elements.

Embodiments of the invention relate to searching of objects stored in, and accessed by, the computing device 10. FIG. 5 illustrates such an object 100 comprising a plurality of elements 102. It is to be realised that embodiments of the invention are applicable to many such objects which may, for example, be text documents, sound files, video files, tabulated data, data stored in mark-up form, any combination of these, etc.

In an embodiment, the objects are media files comprising, image sound and/or music files and the elements are tags relevant to the content of the objects. The tags may be formatted as meta-data. In a further embodiment, the elements are location data relevant to the objects. Embodiments of the invention are applicable to objects and elements other than those specified. It is to be realised that in embodiments of the invention the elements relate to characteristics of the objects concerned.

Specific embodiments of the invention are described below with reference to a document and words in that document. However, embodiments of the invention relate to other digital objects comprising elements 102. For digital object 100, the elements 102 may be defined appropriately.

Figure 6:
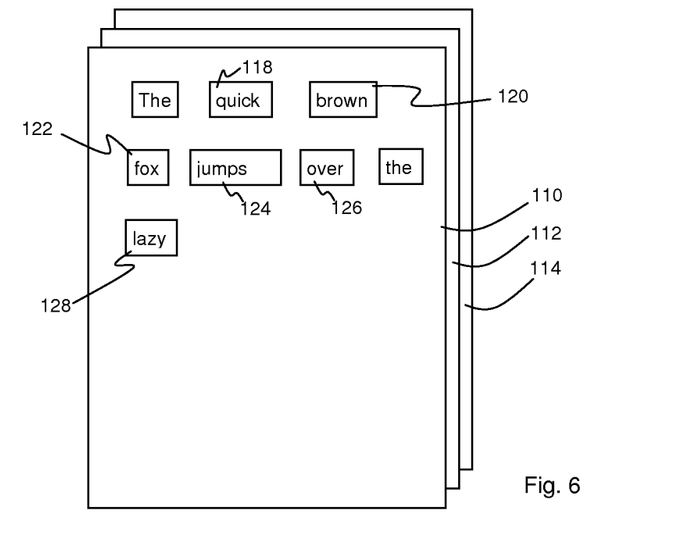
FIG. 6 illustrates a plurality of documents.

FIG. 6 illustrates three documents 110, 112 and 114; only the detail of document 110 is shown. The documents in this embodiment are collections of text in computer readable form. The text is arranged into words. In an initial step the elements of the document, here the words of the document, are identified. As illustrated in FIG. 6, words "quick" 118, "brown" 120, "fox" 122, "jumps" 124, "over" 126 and "lazy" 128 have been identified in document 110.

Documents 112 and 114 comprise elements which may be both the same as, and different from, the elements illustrated in document 110.

Generally, the process of identifying objects in a document may include one or more filters. In the embodiment illustrated in FIG. 6 a filter has been employed to exclude short, common words in the English language. Therefore the two instances of the word "the" illustrated in FIG. 6 have not been identified as elements.

The documents 110, 112 and 114 are stored on non-volatile memory 36 of computing device 10 (FIG. 2). Once the elements are identified in the objects, each element undergoes an encoding schema, such as that illustrated in FIGS. 7A and 7B.

Figure 7A:
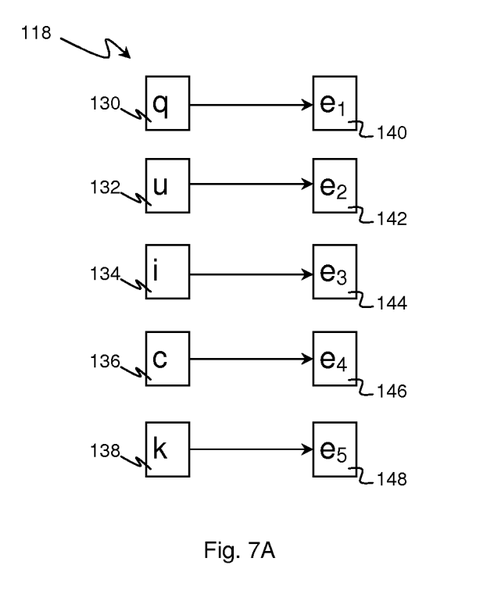
FIGS. 7A and 7B illustrate schema for use in embodiments of the invention.

FIG. 7A illustrates a process whereby portions of a word element 118 are encoded to produce numbers. The word element 118 is split up in to characters: 'q' 130, 'u' 132, 'i' 134, 'c' 136 and 'k' 138. Each character is then converted into a number so that character 'q' 130 produces number $e_1$ 140, character 'u' 132 produces number $e_2$ 142, character 'i' 134 produces number $e_3$ 144, character 'c' 136 produces number $e_4$ 146 and character 'k' produces number $e_5$ 148.

The process whereby the numbers illustrated in FIG. 7A are produced uses the ASCII (American Standard Code for Information Interchange) character encoding schema to convert each character to a number. Any other character encoding schema may be used instead such as UNICODE, particularly where the elements are not English-language words.

During the process of encoding, certain simplifications may be imposed on the schema. Therefore, for example, the decision may be made to encode both capital and small letters of the alphabet to the same number. These simplifications may depend on the language of the elements and the design parameters for the search service under consideration.

Figure 7B:
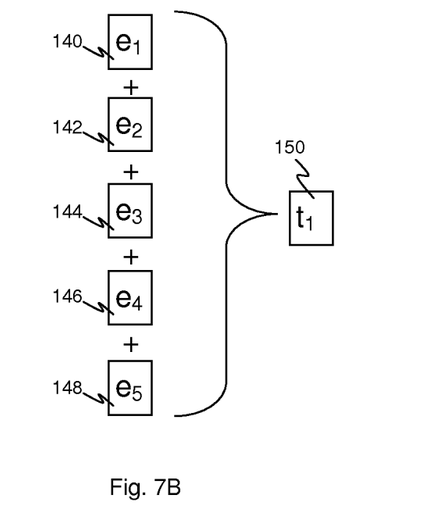

FIG. 7B illustrates an additional portion of the encoding process used with embodiments of the invention. Once the numbers $e_1$, e2, e3, e4 and e5 have been obtained, a token $t_1$ is calculated therefrom. In the embodiment illustrated in FIG. 7B, the token is calculated by concatenating the ASCII encoded numbers corresponding to the characters of the word together, as illustrated in FIG. 7B.

In this manner, each of the word elements identified for encoding is represented by a number and each distinct word identified in the documents 110, 112 and 114 will have a numerical representation under this scheme. The rules of this process whereby the token $t_1$ is derived are the token encoding for this embodiment.

Figure 8:
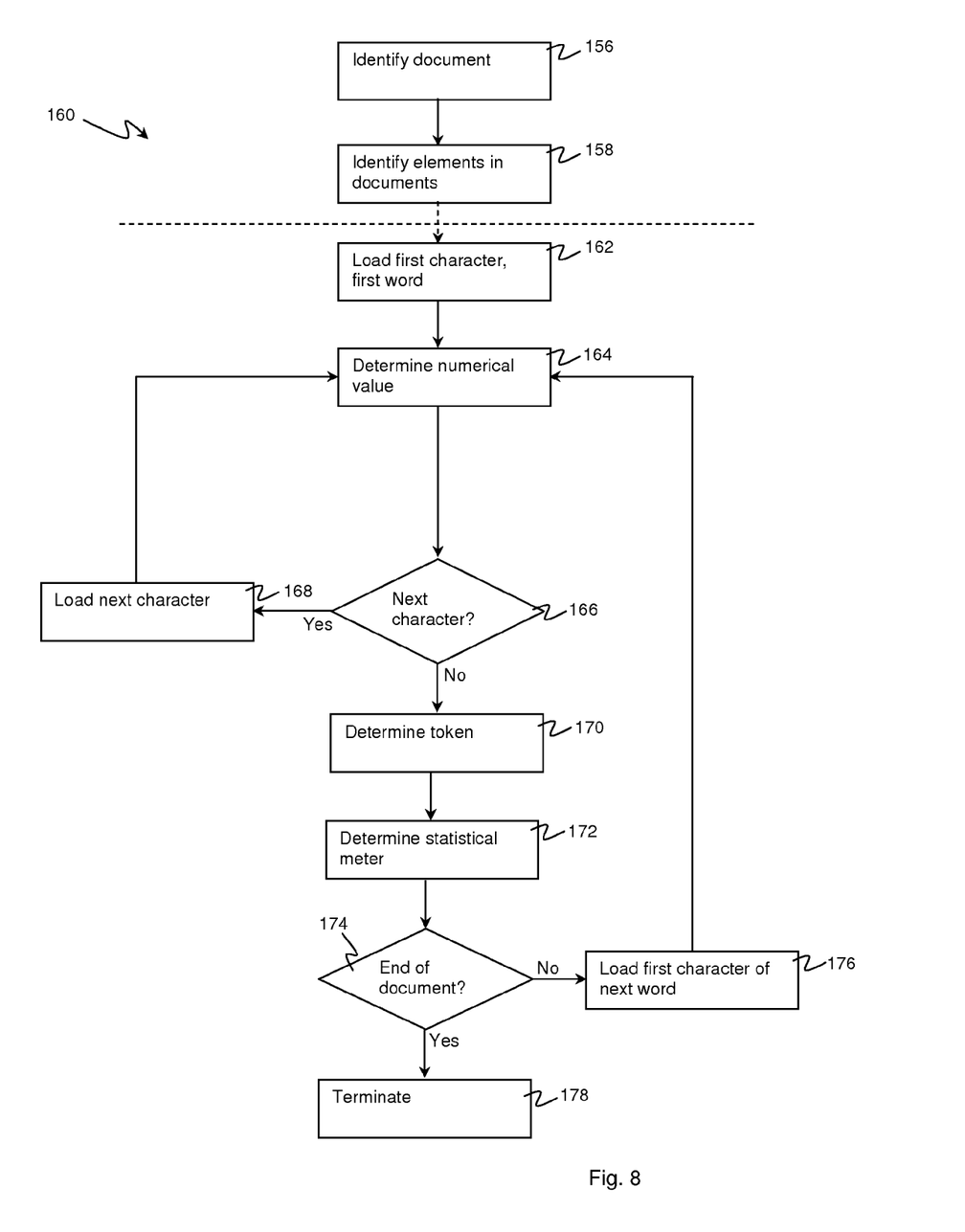
FIG. 8 illustrates a process according to an embodiment of the invention.

FIG. 8 illustrates a process 160 whereby an element is tokenised according to the schemas illustrated in FIGS. 7A and 7B. During an initialisation phase (delineated by the dashed line) documents are identified for inclusion in a repository (block 156) and word elements of the documents are identified (block 158).

Once the initialisation phase is complete, the process begins at an initial block 162, where the first character of the first word element is loaded. Then, at block 164 the numerical value of the character loaded at step 162 is determined. As mentioned this numerical value will be determined with referenced to the ASCII encoding of the character in this embodiment. However in other embodiments other character encoding schemes are used. A further embodiment in this respect is described below with reference to FIG. 14.

Once the numerical value of the character has been determined at block 164, the process then proceeds to block 166 where a determination is made whether a further character exists in the current word element to be processed. If there are further characters to be processed, the process will move to block 168 where the next character in the current word element is loaded and the process then returns to block 164 to determine the value of the now-loaded character. Thereafter the process will continue on to block 166, as described.

If it is determined at block 166 that the end of the current word element has been reached, the process will proceed to block 170. At block 170 the value of the token corresponding to the current word element is determined. As described, in the current embodiment, the token is created by concatenating together the values of the constituent characters, according to the ASCII encoding schema, in the order the characters occur in the word, although other schemas or processes could be employed at block 170 to determine the token for the element.

At the next block, block 172 a statistical meter is calculated which produces a meter for how important that element is. The statistical meter may relate to only the current document, to all documents currently under consideration, or may relate to both the current document and all documents. In the current embodiment, the TFIDF (term frequency-inverse document frequency) is calculated for the word currently under consideration in relation to the current document and all documents under consideration.

At the following block, block 174 a determination is made as to whether the end of the current document has been reached. If there are additional word elements in the current document to be tokenised, the process will proceed to block 176 where the first character of the next word element is loaded and the process then returns to step 164 where the above process repeats for the next element in the document.

If it is determined at block 174 that the end of the current document has been reached, the process will be terminated at block 178.

The process 160 illustrated in FIG. 8 is repeated for each document to be considered. In this manner each word element in each document (here the documents 110, 112 and 114 of FIG. 6) which has been earmarked for tokenisation will have tokens assigned thereto.

Figure 9:
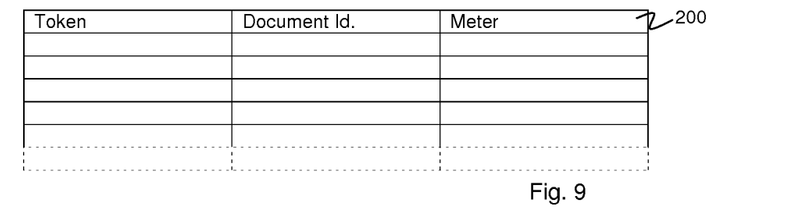
FIG. 9 illustrates a table of tokens produced according to the process of FIG. 8.

Once the process of FIG. 8 has been completed, the determined values are stored in a table in database 92 (FIG. 4). FIG. 9 illustrates a table 200 of tokens produced by the process 160 of FIG. 8. The illustration of FIG. 9 is only schematic, showing the layout of the table 200 and, as indicated by the dashed lines, only the initial entries in table 200 are shown. In addition, the table stores the determined values for each of the cells illustrated. The table includes a first column in which the determined value of the token is stored. In the second column, a document identifier is stored. In the third column, the statistical meter calculated in block 172 is stored. Therefore, for each token stored, there is also stored a document identifier indicating in which document the token was found together with an indication of how important the word corresponding to that token is, when compared against all the documents in which that word occurs.

Therefore, if a word occurs in more than one document, there will be a row in table 200 corresponding to each occurrence of the word in each document.

Once the table 200 depicted in FIG. 9 has been established, the table is ordered so that the tokens are listed in numerical order. In the embodiment illustrated, the tokens are sorted numerically so that the token of each row is larger than the token of the preceding row. In a further embodiment the table may be sorted according to the tokens so that the tokens are listed in descending order.

Listing the tokens in numerical order where the tokens have a numerical representation is advantageous in that it allows the number of possible results to be significantly reduced for a search query where some order of magnitude for the token required to satisfy the search query is known.

Figure 10A:
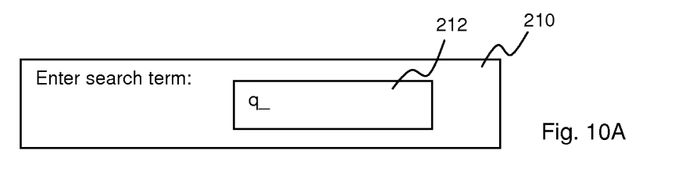
FIGS. 10A to 10D illustrate a user interface to a search client according to an embodiment of the invention.
Figure 10B:
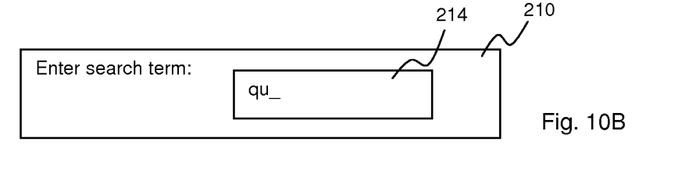
Figure 10C:
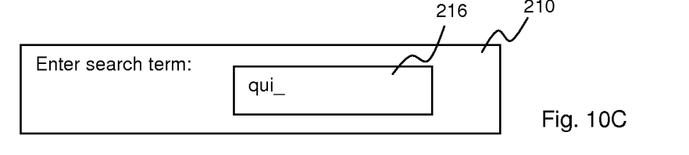
Figure 10D:
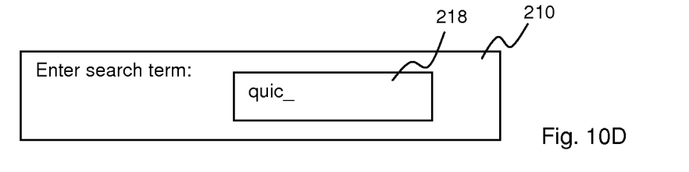

FIGS. 10A to 10D illustrate a user interface to a search client according to an embodiment of the invention. The user interface 210 includes a text box 212, as illustrated in FIG. 10A, in which the user inputs a search query. The user has input the character 'q' in the search box 212 illustrated in FIG. 10A. In FIG. 10B, the user has input an additional character to the search box 214. Similarly, FIGS. 10C and 10D illustrate the same search box as the user inputs successive characters of a search term. Therefore, in FIG. 10C, text box 216 includes the characters "qui" and text box 218 in FIG. 10D includes the characters "quic", the user having entered the character "c".

Figure 11:
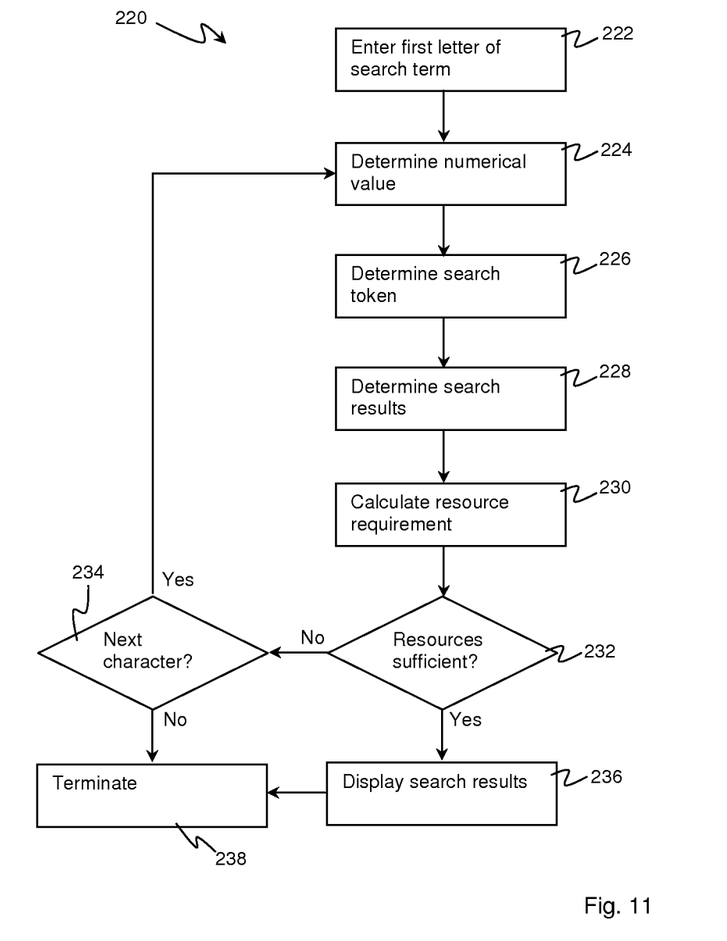
FIG. 11 illustrates a process according to an embodiment of the invention.

FIG. 11 illustrates a process 220 whereby the search term entered by the user is encoded and search results, as well as resource requirements, are calculated according to an embodiment of the invention. The process begins at block 222 when a user enters the first character of a search term, as illustrated in FIG. 10A. When the first character has been entered, the process proceeds to block 224 where the numerical representation of the character is determined. This is done with reference to the same encoding schema used to produce tokens from the documents in the process illustrated in FIG. 8. Therefore, in the current embodiment, the ASCII encoding scheme is used.

Once the numerical value has been determined in step 224, the process will proceed to step 226 where the search token is determined. The search token is produced in the same manner as the tokens for the elements of the documents under consideration, and as listed in table 200 (FIG. 9). In the first iteration, where only a single character of the search term has been specified, the search token will equal the encoding value of this first character. However, for subsequent iterations, when more characters for the search term have been specified, each currently-specified character is taken into account to determine the search token (as described below).

At the following block, block 228, the possible search results are determined. At this point in the process, where only a single, initial character of the search term has been entered, the possible search results will comprise all those tokens which could satisfy the entered search term. Therefore, the possible search results will comprise that subset of all the rows of table 200 illustrated in FIG. 9 where the tokens correspond to words starting with the same character as the first character entered by the user (which is now the value of the search token too). This process is described in greater detail below.

Once the possible search results are calculated at block 228, the process proceeds to step 230 where the resources necessary to complete the search request are calculated. Because a determination was made at step 224 regarding all the possible search results which could satisfy the search term, a determination can be made here at block 230 as to the resources needed to complete the search. In the current embodiment, for each search result returned to the user, the corresponding document needs to be retrieved and loaded into volatile memory 34 (FIG. 2), before a portion thereof is displayed to a user in an ordered results set. As the size of each document is known, the memory required to store that document is known and therefore, for the subset of tokens which may satisfy the query specified by the user in block 222 the amount of volatile memory 34 required to complete the search is determined.

Although the resource concerned in the present embodiment is volatile memory, it is to be realised that similar calculations may be made for many other resources such as processing requirements, bandwidth requirements, battery power, etc. It is to be realised that in a computing environment where resources are constrained, such as in the mobile computing device 10 illustrated in the accompanying Figures, it is useful to be able to determine the resources required so that the search is only completed if the resource requirement can be met.

In the following block of process 220, block 232 a determination is made as to whether the available resources are sufficient to meet the requirements to complete the search for the first character of the search term (for this iteration). It is to be realised that the determination of what resources are considered to be sufficient may be calculated by the system software of the computing device 10 or may have been previously specified by the user (or a combination of these).

If it is determined that the resources are sufficient, the process proceeds to block 236 where the search results are displayed. Alternatively, if it is determined at step 232 that the resources are not sufficient, the process will proceed from block 232 to block 234. At block 234 the next character of the search term is awaited. If there is no additional character to be entered by the user, the process will proceed to block 238 where it will terminate.

However, if a user does enter an additional character for the search term at block 234, the process will return to step 224 and iterate through the aforementioned process, but for this iteration make the determinations in respect of the first and second characters of the search term. Therefore, at block 224 the numerical value of the second character will be determined. At block 228 those search results which satisfy both the first and the second characters are calculated and, at block 230, the resources required to satisfy the now-expanded search term are calculated, as described below.

It is to be realised for this embodiment, that generally the greater the number of characters of the search term which are entered, the smaller the possible subset of results which satisfy that query will be. Therefore, the search will only be completed once the search term has been specified with sufficient particularity to meet the predetermined and/or calculated resource requirements.

Figure 12A:
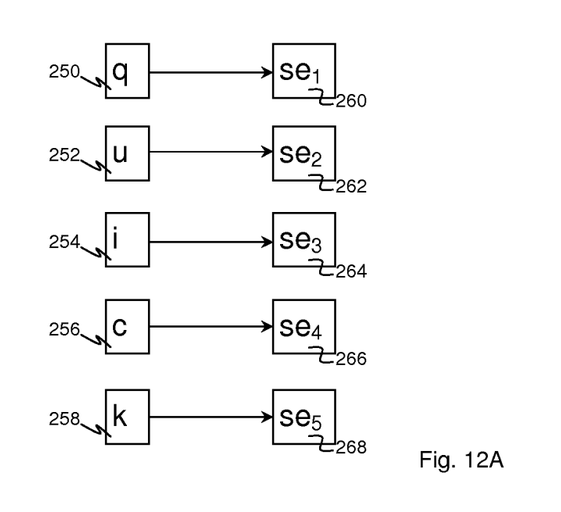
FIGS. 12A and 12B illustrate schema for use in embodiments of the invention.

FIGS. 12A and 12B illustrate the encoding schemes used to encode the characters of the search term as occurs at step 224 of the process 220 of FIG. 11. The search term in this instance comprises characters 'q' 250, 'u' 252, 'i' 254, 'c' 256 and 'k' 258. Each of the characters is encoded according to the ASCII encoding scheme and this is used to produce the corresponding numerical representations of the characters. Therefore character 250 will produce number $se_1$ 260, character 252 will produce number $se_2$ 262, character 254 will produce number $se_3$ 264, character 256 will produce number $se_4$ 266 and character 258 will produce number $se_5$ 260.

Figure 12B:
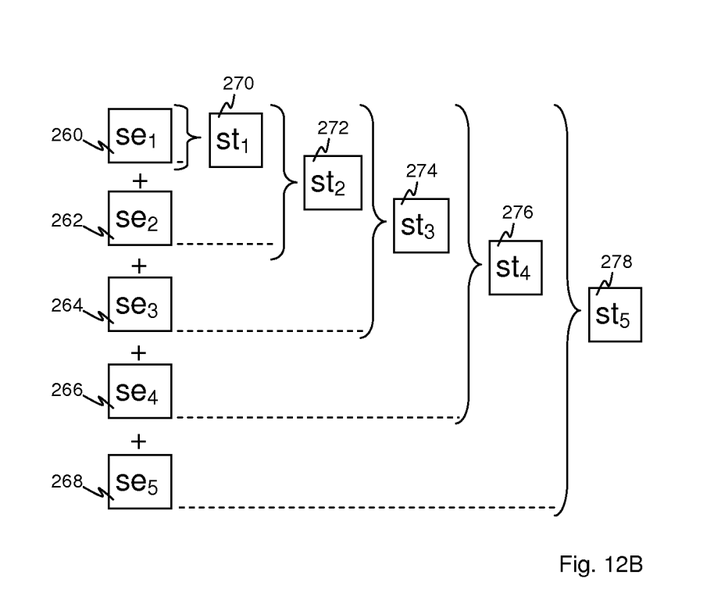

FIG. 12B illustrates the manner in which the search token is determined at step 226. Each of the values determined according to the schema of FIG. 12A for each currently-inserted value of the search term is concatenated together in the order in which they were entered. Therefore, the search token for the first iteration, $st_1$ 270 corresponds to number $se_1$ 260. However, the search token for the second iteration $st_2$ 272 corresponds to a concatenation of $se_1$ 260 and $se_2$ 262. Similarly, the search token for the third iteration $st_3$ 274 corresponds to a concatenation of $se_1$ 260, $se_2$ 262 and $se_3$ 264, the search token for the fourth iteration $st_4$ 276 corresponds to a concatenation of $se_1$ 260, $se_2$ 262, $se_3$ 264 and $se_4$ 266, and the search token for the fifth iteration $st_5$ 278 corresponds to a concatenation of $se_1$ 260, $se_2$ 262, $se_3$ 264, $se_4$ 266 and $se_5$ 268.

Figure 13:
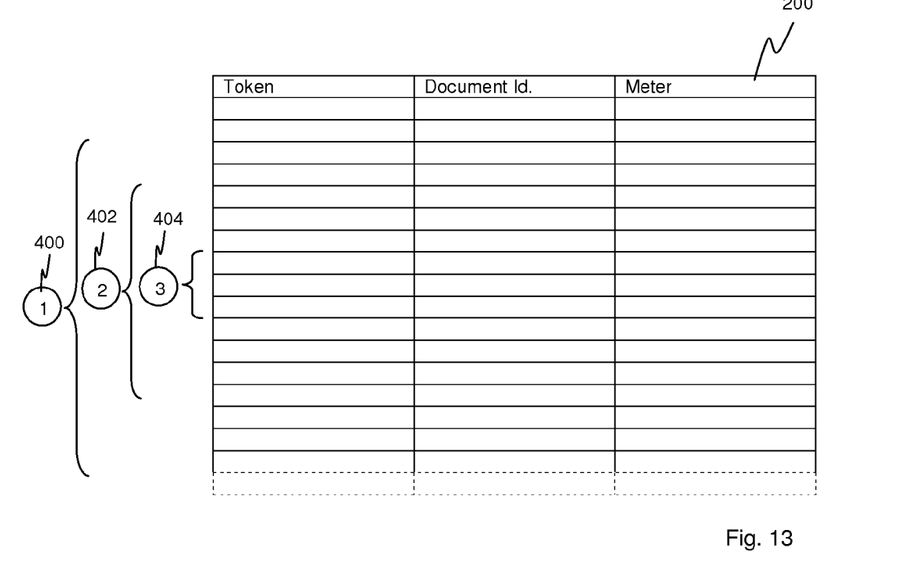
FIG. 13 is a further illustration of the table of tokens of FIG. 9.

FIG. 13 is a representation of the table 200 of FIG. 9 with more entries in the table 200 showing in FIG. 13 than illustrated in FIG. 9. As previously mentioned, the table 200 is numerically sorted according to the numerical representation of the tokens. Therefore when a search token is calculated, this can be quickly and efficiently compared to the tokens in table to determine which of those may overlap.

Therefore, if the value of the search token calculated at the first iteration is $st_1$, then the process determines that only those tokens which have a value which matches the value of $st_1$ concatenated with a hypothetical $st_2$ where $st_2$ could be the largest value used in the encoding schema for the second character. Therefore, a determination is made for the maximum range 1 400 of the possible tokens which match the first specified character of the search term for the first iteration.

For each subsequent iteration, a similar range is calculated based on the characters of the search term entered up to that point. Therefore, as illustrated in FIG. 13, the range 2 402 corresponds to the second iteration where two search characters have been entered and the range 3 404 corresponds to the third iteration where three characters of the search term have been entered.

For each succeeding iteration, the range of the possible tokens (and therefore the number of relevant search results) will be equal to, or less than (depending on the value of the next character) the range identified for the preceding iteration. Providing sufficient characters of the search term are entered and their values differ, the range of possible search results will decrease and therefore the resources necessary to complete the search request will decrease.

The embodiment described above uses the value of a character as defined by the ASCII encoding scheme as the basis for calculating the tokens for the elements of the documents and for the search tokens. Embodiments of the invention rely on encoding the tokens and search tokens in a manner which does not avoid collisions. In further embodiments different encoding schemas may be used.

Figure 14:
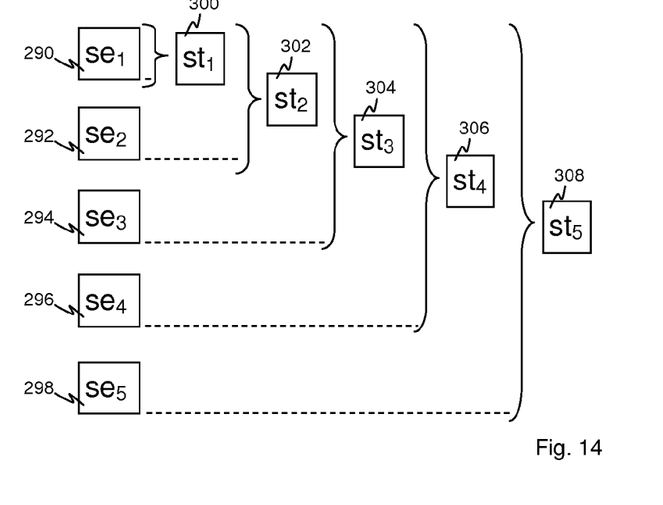
FIG. 14 illustrates a schema for use in further embodiments of the invention.

FIG. 14 illustrates the encoding of search tokens according to a further encoding schema. This schema employs a differential encoding schema so that the value of a character is dependent upon the value of the preceding character:

$$f(t) = \sum_{i=1}^{l} 10^{(e_{max}-i)}(a_i - a_{(i-1)}) \quad (1)$$

Where l is the term length, $a_i$ is the integer representation of the $i^{th}$ character in a term (where $a_0$=0) and $e_{max}$ is the maximum exponent value to which we are able to raise the encoded value within the bounds of the platform accuracy; it is given by:

$$e_{max} = \lfloor p \log 2 \rfloor - \lceil \log a_{max} \rceil \quad (2)$$

Where $a_{max}$ is the maximum value for any $a_i$ and p is the number of bits given for precision by the memory address range (typically 64 or 32).

In this embodiment, the value of $a_i$ is related to the character encoding used to store the characters concerned (i.e. the ASCII or Unicode value, as the case may be).

The use of differential encoding when determining tokens, such as that used in this embodiment, has the advantage that collisions between encoding operations (when two different terms decode to the same token) may be reduced. This is due to the fact that this differential encoding avoids summation with large carries.

FIG. 14 illustrates a number of characters of a search term in numerical form (derived from the character encoding used): $se_1$ 290, $se_2$ 292, $se_3$ 294, $se_4$ 296 and $se_5$ 298. In this figure the resulting search tokens $st_1$ 300, $st_2$ 302, $st_3$ 304, $st_4$ 306 and $st_5$ 308 have been produced by the application of equation (1) to the values of the characters involved. It is to be realised that the tokens for the documents and stored in a table analogous to table 200 of FIG. 9 are calculated using the same character encoding and the application of equation (1). In this embodiment, the token encoding includes determining the character encoding for the character and the application of equation (1) to the resultant number.

In this embodiment, the tokens and the search tokens are represented as floating point numbers. As will be appreciated from the foregoing, in embodiments of the invention, the first digits of a token in numerical form have a greater significance, specifically when comparing tokens and search tokens. Therefore, it is advantageous to use floating point numbers to represent the numerical values of the tokens so that the desired accuracy may be maintained without having to manage the allocation of memory space for potentially large integers (for example). Floating point numbers retain the desired number of significant figures, and truncate less significant figures, more easily than other representations.

In this embodiment, a calculation is also made to determine the resources necessary to complete the search request. If we denote k as a hardware-specific constant which is determined by the available resources (for example, the available memory in the form of a stack heap), then:

$$\frac{T}{S^n} \leq k \quad (3)$$

where T is the number of documents associated with the search term in question, S is the number of characters utilised in the token encoding and n is the number of characters specified for the search term in question. In this respect, S represents the alphabet used to encode the tokens and search tokens. For example, if the words to be encoded are in the English language, and the initial filtering converts all upper case characters to small character, as well as filtering all punctuation, the alphabet would be: {0, 1, 2, ..., 8, 9, a, b, c, ... x, y, z} and S would be 36.

The aforementioned embodiments calculate necessary resources before displaying a result to the specified search. In further embodiments, the determination of when to return results to the user may depend on other factors such as the maximum number of results that can (due to hardware limitations) be displayed to the user or the maximum number of results the user has chosen to be returned.

The calculation of resources necessary to complete a search request is advantageous in environments where resources are limited. For example, in mobile computing devices resources such as memory, power and available processing cycles, among others are often limited. Embodiments of the invention operating in such devices enable a search to be executed only when sufficient resources exist to do so. Therefore, embodiments allow searches to be conducted which may not otherwise be possible in the same device.

Furthermore, in other devices resources may be available, but may be managed so that a predetermined level or amount of resource is allocated to certain processes (either by a user, or by calculations having been made by other software components on the device, or elsewhere). In such devices, embodiments of the invention allow a better and more accurate management of resources. In a further embodiment, the database 92, database manager 90 and database are remote from one another. Therefore, interprocess communication between client 80, server 86 and database manager 90 occurs over a network where the bandwidth is limited. In this embodiment, the resource calculation of block 230 of FIG. 11 comprises calculating the bandwidth necessary to complete the search request and only completing the search request if it is determined that the available bandwidth is sufficient. It is to be realised that the calculation of available resources may involve determining whether more than one resource requirement is met, in which case the search may only be completed if all resource requirements are met.

In further embodiments, no determination of resource requirements is made and block 230 of FIG. 11 is omitted in such embodiments.

Furthermore, as described above in relation to FIG. 8 a statistical meter is calculated and stored in table 200 for each token-document relation. In a further embodiment, step 172 is omitted and no statistical meter is determined.

However, returning to the embodiment of FIG. 8, where the statistical meter is included, the statistical meters are used to determine which of the results previously determined to be relevant to the specified search term are more relevant and which of these are less relevant. This process involves ranking the search results which is, in turn, used to determine the order in which the search results are returned to a user. Search results are ranked by constructing a vector for each document, the dimension of the vector corresponding to an element and the value at that dimension being determined by the aforementioned statistical meter for that element in that document.

Once all the relevant search results have been represented as vectors, the distance between the search term (also represented as a vector) and each document is calculated. In this embodiment the cosine distance measure is used. Other measures of distance may be used and may, in particular, depend on the type of statistical meter used. The use of such statistical meters to rank search results is known and is therefore not described herein in additional detail.

The invention claimed is:

1. A method comprising:
   accessing, by a computing device, an ordered list comprising a plurality of tokens, said tokens corresponding to elements of one or more objects, said list storing, for each token in said list, a corresponding document identifier, wherein said list is ordered according to a value of said token and said tokens are encoded using differential encoding whereby a value for a second and each subsequently encoded character is dependent on a value of a preceding character,
   receiving, by the computing device, a search term comprising a plurality of parts, and
   identifying, by the computing device, a subset of said list for a first part of said search term and a further subset for at least one subsequent part of said search term, wherein each subset corresponds to possible results for said search term.

2. The method according to claim 1 wherein successive subsets are iteratively identified for more than one successive part of said search term.

3. The method according to claim 2 wherein each iteration has a corresponding part of said search term and a subset corresponding to said iteration is identified with reference to said corresponding part, and each preceding part, of said search term.

4. The method according to claim 1 wherein said tokens are encoded such that two or more of said elements may correspond to the same token.

5. The method according to claim 1 further comprising: for an identified subset, determining a resource requirement necessary to complete a search request, determining if said resource requirement meets a specified criteria; and completing said search request if said resource requirement meets said specified criteria.

6. The method according claim 5 further comprising iteratively identifying successive subsets for more than one successive part of said search term and, for a successive subset of a successive iteration, determining if said resource requirement meets said specified criteria.

7. Apparatus comprising: at least one processor, and at least one memory including computer code, the at least one memory and the computer code configured to, with the at least one processor, cause the apparatus at least to perform:
   accessing an ordered list comprising a plurality of tokens, said tokens corresponding to elements of one or more objects, said list storing, for each token in said list, a corresponding document identifier, wherein said list is ordered according to a value of said token and said tokens are encoded using differential encoding whereby a value for a second and each subsequently encoded character is dependent on a value of a preceding character,
   receiving a search term comprising a plurality of parts, and
   identifying a subset of said list for a first part of said search term and a further subset for at least one subsequent part of said search term, wherein each subset corresponds to possible results for said search term.

8. Apparatus according to claim 7 wherein the at least one memory and the computer code are further configured to, with the at least one processor, cause the apparatus to iteratively identify successive subsets for more than one successive part of said search term.

9. Apparatus according to claim 8 wherein each iteration has a corresponding part of said search term and a subset corresponding to said iteration is identified with reference to said corresponding part, and each preceding part, of said search term.

10. Apparatus according to claim 7 wherein said tokens have a numerical value and said list is ordered according to a numerical value of said tokens.

11. Apparatus according to claim 10 wherein said numerical value is represented in the list as a floating point number.

12. Apparatus according to claim 7 wherein said tokens are encoded such that two or more of said elements may correspond to the same token.

13. Apparatus according to claim 7, wherein the at least one memory and the computer code are further configured to, with the at least one processor, cause the apparatus to: for an identified subset, determine a resource requirement necessary to complete a search request, determine if said resource requirement meets a specified criteria; and complete said search request if said resource requirement meets said specified criteria.

14. Apparatus according to claim 13, wherein the at least one memory and the computer code are further configured to, with the at least one processor, cause the apparatus to iteratively identify successive subsets for more than one successive part of said search term and, for a successive subset of a successive iteration, determine if said resource requirement meets said specified criteria.

15. Apparatus according claim 13 wherein determining a resource requirement necessary to complete a search request is carried out with reference to one or more of: a number of parts of said search term, a number of documents which may be associated with said search term, and a number of characters utilized in said token encoding.

16. A computer readable medium storing instructions, said instructions being such that when processed by a processor configure said processor to:
   access an ordered list comprising a plurality of tokens, said tokens corresponding to elements of one or more objects, said list storing, for each token in said list, a corresponding document identifier, wherein said list is ordered according to a value of said token and said tokens are encoded using differential encoding whereby a value for a second and each subsequently encoded character is dependent on a value of a preceding character,
   receive a search term comprising a plurality of parts, and
   identify a subset of said list for a first part of said search term and a further subset for at least one subsequent part of said search term, wherein each subset corresponds to possible results for said search term.

17. A method comprising:
   representing each of a plurality of elements of one or more objects as a corresponding token with a numerical value,
   accessing, by a computing device, a list of tokens having a numerical value, each token representing at least one of a plurality of elements of one or more objects, said list storing, for each token in said list, an object identifier identifying an object wherein an element corresponding to said token may be found, said list being ordered according to said numerical values of said tokens and said tokens being encoded using differential encoding whereby a value for a second and each subsequently encoded character is dependent on a value of a preceding character,
   receiving, by a computing device, a search request comprising a search term having a plurality of parts, receiving, for each part in said search term, an indication of a subset of said list which satisfies said search request, and predicting, by a computing device, a resource requirement necessary to complete said search request based on a number of parts of said search term.

18. Apparatus comprising: at least one processor, and at least one memory including computer code, the at least one memory and the computer code configured to, with the at least one processor, cause the apparatus at least to perform:

representing each of a plurality of elements of one or more objects as a corresponding token with a numerical value, accessing a list of tokens having a numerical value, each token representing at least one of a plurality of elements of one or more objects, said list storing, for each token in said list, an object identifier identifying an object wherein an element corresponding to said token may be found, said list being ordered according to said numerical values of said tokens and said tokens being encoded using differential encoding whereby a value for a second and each subsequently encoded character is dependent on a value of a preceding character, receiving a search request comprising a search term having a plurality of parts, receiving, for each part in said search term, an indication of a subset of said list which satisfies said search request, and predicting a resource requirement necessary to complete said search request based on a number of parts of said search term.

\* \* \* \* \*